United States Patent
Zhang et al.

(10) Patent No.: US 9,231,852 B2
(45) Date of Patent: Jan. 5, 2016

(54) GREENING THE NETWORK WITH THE POWER CONSUMPTION STATUSES OF NETWORK COMPONENTS

(75) Inventors: Mingui Zhang, Shenzhen (CN); Jie Dong, Shenzhen (CN); Sam K. Aldrin, Santa Clara, CA (US); Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 920 days.

(21) Appl. No.: 13/372,625

(22) Filed: Feb. 14, 2012

(65) Prior Publication Data

US 2013/0031244 A1    Jan. 31, 2013

Related U.S. Application Data

(60) Provisional application No. 61/511,461, filed on Jul. 25, 2011.

(51) Int. Cl.
| | |
|---|---|
| *G06F 15/173* | (2006.01) |
| *H04L 12/721* | (2013.01) |
| *H04L 12/24* | (2006.01) |

(Continued)

(52) U.S. Cl.
CPC ............. *H04L 45/124* (2013.01); *H04L 41/12* (2013.01); *H04L 45/12* (2013.01); *H04L 45/302* (2013.01); *H04L 45/42* (2013.01)

(58) Field of Classification Search
CPC ........ H04L 41/12; H04L 45/12; H04L 45/302
USPC ........................................................ 709/224
See application file for complete search history.

(56) References Cited

U.S. PATENT DOCUMENTS

| | | |
|---|---|---|
| 2003/0033394 A1* | 2/2003 | Stine ............................ 709/222 |
| 2003/0040316 A1 | 2/2003 | Stanforth et al. |

(Continued)

FOREIGN PATENT DOCUMENTS

| | | |
|---|---|---|
| EP | 2166777 A1 | 3/2010 |
| JP | 2006237849 A | 9/2006 |

(Continued)

OTHER PUBLICATIONS

Foreign Communication From a Related Counterpart Application, PCT Application No. PCT/US2012/048109, International Search Report dated Nov. 7, 2012, 4 pages.

(Continued)

*Primary Examiner* — Richard G Keehn
(74) *Attorney, Agent, or Firm* — Conley Rose, P.C.; Grant Rodolph; Brandt D. Howell (57) ABSTRACT

In an embodiment, the disclosure includes an apparatus comprising a data store which comprises cost data associated with use of a path in a communications network. The data store also comprises power consumption data associated with the use of the path. The apparatus further comprises at least one processor configured to determine a score for the path based on the cost data and the power consumption data. The disclosure also includes an apparatus comprising a path computation element (PCE) configured to receive data from a plurality of network elements (NEs). The data comprises cost and power consumption data for establishing a path between a plurality of the NEs. The PCE is configured to determine a score for the path based on the cost and power consumption data.

18 Claims, 7 Drawing Sheets

(51) Int. Cl.
*H04L 12/725* (2013.01)
*H04L 12/717* (2013.01)

(56) References Cited

U.S. PATENT DOCUMENTS

| | | | |
|---|---|---|---|
| 2004/0052526 A1* | 3/2004 | Jones et al. | 398/50 |
| 2010/0284287 A1* | 11/2010 | Venuto | 370/252 |
| 2011/0019669 A1* | 1/2011 | Ma et al. | 370/389 |
| 2011/0075583 A1* | 3/2011 | Imai et al. | 370/252 |
| 2011/0205919 A1* | 8/2011 | Imai | 370/252 |
| 2012/0198092 A1* | 8/2012 | Sheridan et al. | 709/241 |
| 2012/0224217 A1* | 9/2012 | Oba et al. | 358/1.15 |
| 2013/0070754 A1* | 3/2013 | Iovanna et al. | 370/351 |
| 2013/0088997 A1* | 4/2013 | Briscoe et al. | 370/252 |

FOREIGN PATENT DOCUMENTS

| | | | |
|---|---|---|---|
| JP | 2011015343 A | | 1/2011 |
| JP | 2011077954 A | | 4/2011 |
| SE | 10164850 | * | 6/2010 |

OTHER PUBLICATIONS

Foreign Communication From a Related Counterpart Application, PCT Application No. PCT/US2012/048109, Written Opinion dated Nov. 7, 2012, 8 pages.

Shin, Il-Hee, et al., "Enhanced Power-Aware Routing for Mobile Ad-Hoc Networks," AD-HOC Mobile and Wireless Networks, Lecture Notes in Computer Science, Berlin, Germany, Jan. 1, 2005, pp. 285-296.

Przygienda, T., et al., "M-ISIS: Multi Topology (MT) Routing in Intermediate System to Intermediate Systems (IS-ISs)," RFC 5120, Feb. 2008, 15 pages.

"Intel and Core i7 (Nehalem) Dynamic Power Management," http://cs466.andersonje.com/public/pm.pdf, downloaded from the Internet Nov. 28, 2011, 11 pages.

Psenak, et al., "Multi-Topology (MT) Routing in OSPF," RFC 4915, Jun. 2007, 21 pages.

Heller, et al., "ElasticTree: Saving Energy in Data Center Networks," Proceedings of USENIX NSDI, 2010, 16 pages.

Partial English Translation and Abstract of Japanese Patent Application No. JP2006-237849A, Mar. 6, 2015, 4 pages.

Partial English Translation and Abstract of Japanese Patent Application No. JP2011-015343A, Mar. 6, 2015, 3 pages.

Partial English Translation and Abstract of Japanese Patent Application No. JP2011-077954A, Mar. 6, 2015, 7 pages.

Foreign Communication From A Counterpart Application, Japanese Application No. 2014-522963, Japanese Office Action dated Jan. 20, 2015, 3 pages.

Foreign Communication From a Counterpart Application, Japanese Application No. 2014-522963, English Translation of Japanese Office Action dated Jan. 20, 2015, 4 pages.

Foreign communication from a counterpart application, European application 12743835.6, European Office Action, dated Apr. 10, 2015, 8 pages.

Wang, "Topology-Based Routing for Xmesh in Dense Wireless Sensor Networks," Dissertation to The Graduate School—Stony Brook University, Aug. 2007, 123 pages, CP055180152, URL:https://dspace.sunyconnect.suny.edu/bitstream/handle/1951/44964/000000120.sbu.pdf?sequence=2, downloaded from the Internet Mar. 30, 2015.

Nazri, et al., "A Power Reduction Technique for GMPLS-Based Photonic Networks," PGNET 2010, Jun. 22, 2010, pp. 1-5, XP055180367, URL:http://www.cms.livjm.ac.uk/pgnet2010/MakeCD/Papers/2010013.pdf, downloaded from the Internet Mar. 31, 2015.

* cited by examiner

| C-State | P-State |
|---|---|
| Hibernate | 0W |
| Idle | 50W |
| (0,10%] | 70W |
| (10,20%] | 80W |
| (20,30%] | 85W |
| (30,40%] | 88W |
| (40,50%] | 90W |
| (50,100%] | 91W |

GREENING THE NETWORK WITH THE POWER CONSUMPTION STATUSES OF NETWORK COMPONENTS

CROSS-REFERENCE TO RELATED APPLICATIONS

The present application claims priority to U.S. Provisional Patent Application No. 61/511,461 filed Jul. 25, 2011 by Zhang et al. and entitled "Greening the Network with the Power Consumption Statuses of Network Components", which is incorporated herein by reference as if reproduced its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Large scale networks typically comprise many client machines connected to a multi-tiered web of interconnected network elements (NEs). Typically, multiple redundant NEs are present to function as backup systems for each other. In the event that any one NE ceases to function properly, a redundant NE can quickly accept the failed NEs data traffic so that the network can continue to function normally.

Data traffic between client machines is typically routed through the network based solely on a cost algorithm. The cost algorithm may include a variety of metrics meant to represent system delay and reliability. A typical cost algorithm does not include any metric related to the power usage of the network. The result is that traditional cost-only routing ignores energy efficiency and may require a network to function in a manner that is grossly energy inefficient. For example, two data paths may be routed through two NEs even though one NE could handle both routes and allow the other NE to be placed in a hibernation mode. Due to the ever increasing cost of energy and the constant demand for increased communication bandwidth, the adoption of energy efficient processes may save telecommunication service providers from significant monetary waste.

Existing processes are incapable of gathering power consumption data for a network at different network states in a consistent and useful format. Without sufficient power consumption data for the network, intelligent routing decisions for increased energy efficiency cannot be made. Without consistent energy efficiency metrics, any new data paths are setup without regard to energy cost, and existing traffic cannot be transferred to more optimal data paths as system demands change.

SUMMARY

In an embodiment, the disclosure includes an apparatus comprising a data store which comprises cost data associated with use of a path in a communications network. The data store also comprises power consumption data associated with the use of the path. The apparatus further comprises at least one processor configured to determine a score for the path based on the cost data and the power consumption data.

In an embodiment, the disclosure includes an apparatus comprising a path computation element (PCE) configured to receive data from a plurality of NEs. The data comprises a cost and power consumption data for establishing a data path between a plurality of the NEs. The PCE is configured to determine a score for the path based on the cost and power consumption data.

In an embodiment, the disclosure includes a method comprising obtaining cost data for a plurality of paths in a communications network, obtaining power consumption data for the paths, and determining one or more scores for the paths based on the cost data and the power consumption data.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an apparatus and method for obtaining network power consumption data and making intelligent routing decisions based on that power consumption data and traditional cost metrics. Power consumption data for each NE is represented in a tabular format. The power consumption data for the NE are listed in the table for a plurality of discrete data traffic loads passing through the NE. The power consumption data for an NE is the NE's P-State and the traffic loads that correspond to the power consumption data is the NE's C-State. The data traffic loads may include the hibernation mode, the idle states, and loads up to the maximum capacity for the NE, each expressed as a percentage range of the NEs capacity. The routing component, either an NE or a PCE depending on system architecture, gathers and/or stores the power consumption data for each node and/or link to be considered. The routing component may score the current network state and potential alternate network states. Each of the alternate network states may include a newly requested route. Scoring may be performed using the equation $S=\alpha*Cost+\beta*Consumption$, where S is the score, Cost is the total routing cost of that network state, and Consumption is the total power consumption of that network state. $\alpha$ and $\beta$ are coefficients that may be selected by the network operators or other users to weight the calculation in favor of routing cost or energy efficiency. $\alpha$ and $\beta$ may maintain the relationship $\alpha+\beta=1$. Once scoring is complete, the routing component may choose the alternate network state with lowest score and route accordingly. The network may also optimize existing traffic by comparing the score of the current network state with the scores of the alternate network states. If any of the alternate network states has a lower score, the routing component may choose the alternate network state with the lowest score and re-route existing and/or new traffic accordingly.

Figure 1:
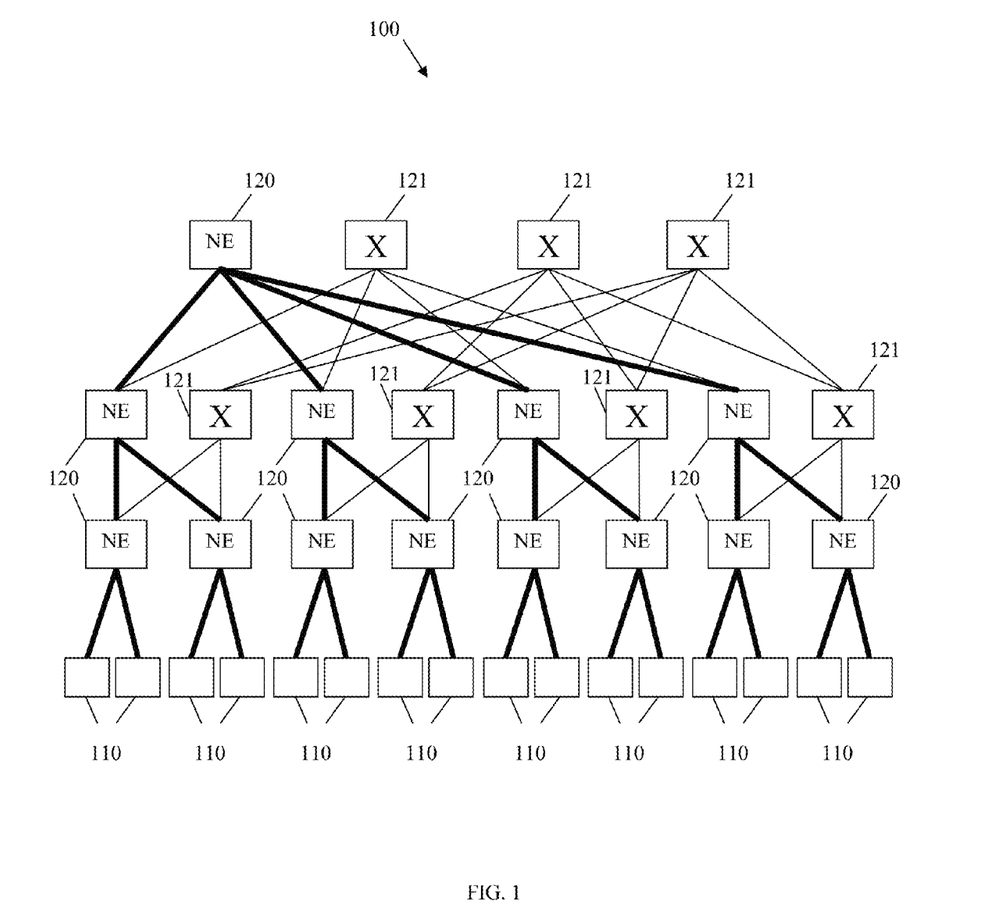
FIG. 1 is a connection diagram of an embodiment of a network.

FIG. 1 is a connection diagram of an embodiment of a network 100. The network 100 comprises one or more path computation clients (PCC) 110 connected through a plurality of nodes. The PCCs 110 may pass information to each other through the nodes and may serve as the source and/or destination of data paths. The network 100 further comprises a plurality of nodes that may comprise NEs 120, which may transmit data between each other and/or the PCCs 110. The nodes of network 100 may further comprise one or more redundant NEs 121. The redundant NEs 121 are present in the network 100 to accept data traffic if an NE 120 fails or becomes overloaded. A redundant NE 121 is a NE 120 that is not needed to transmit data at a given time. Redundant NEs 121 may become NEs 120 and NEs 120 may become redundant NEs 121 depending on the state of the network data traffic load. Each NE 120 manages a portion of the network data traffic load, which is the amount of traffic on the network 100 at a given time. In network 100, NEs 120, redundant NEs 121, or both may act as routing components. A routing component may be responsible for making network routing decisions. A routing component may comprise a data store which may comprise cost data associated with use of one or more data paths in a communications network. The data store may also comprise power consumption data associated with the use of the data paths and/or other data related to making routing decisions in a network. The routing component may also comprise at least one processor configured to determine scores for the paths based on the cost data and the power consumption data as discussed below. Routing in the network 100 may be performed in a distributed fashion.

The NEs 120 and redundant NEs 121 may consume power to operate. NEs 120 may require significant power to manage a small number of data paths and small amounts of additional power to manage additional data paths. Traditional cost-only routing algorithms ignore such power consumption data and may route data paths through both NEs 120 and redundant NEs 121. Such cost-only routing algorithms may require that all network components be active at all times, which may result in sub-optimal power consumption. The network 100 may be optimized by routing as many data paths as possible through some NEs 120, slightly increasing the power cost for those NEs 120, and routing the data paths away from redundant NEs 121, allowing the redundant NEs 121 to be placed in a hibernation mode for significant power savings. The overall power consumption of the network 100 is thereby decreased by the difference between the decreased power consumption of the redundant NEs 121 and the increased power consumption of the NEs 120. The bold lines in FIG. 1 show an optimized routing scheme which allows all redundant NEs 121 to be placed in hibernation mode.

Figure 2:
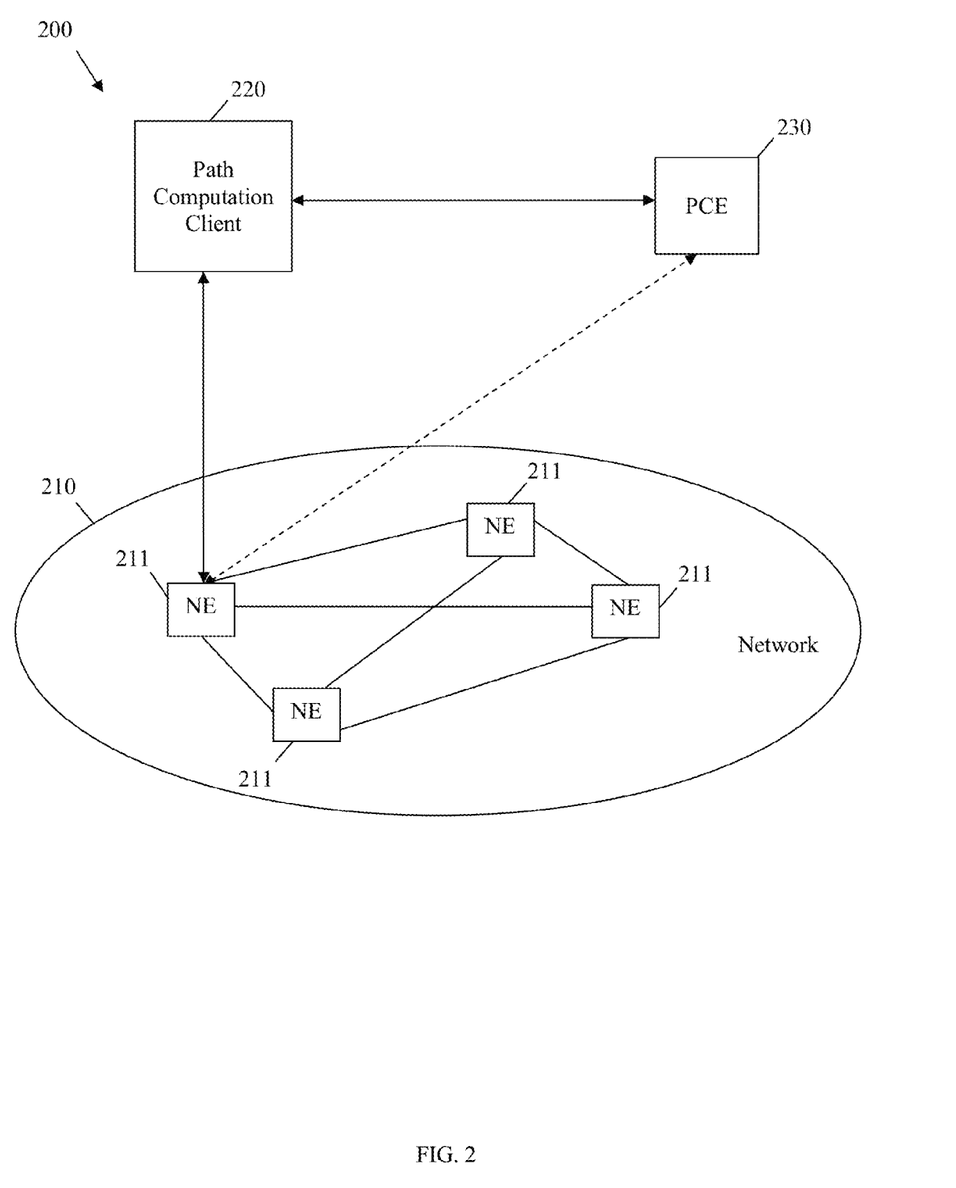
FIG. 2 is a connection diagram of an embodiment of a network.

FIG. 2 is a connection diagram of an embodiment of a network 200. The network 200 operates in a manner that is substantially similar to network 100, except that the one or more PCEs 230 may act as routing components instead of the NEs 120 and 121 as in network 100. The PCEs 230 may be configured to receive data from a plurality of NEs 211, using Interior Gateway Protocol (IGP), such as Open Shortest Path First (OSPF) or Intermediate System to Intermediate System (IS-IS), Simple Network Management Protocol (SNMP), and/or similar protocols or algorithms. The data may comprise routing costs and power consumption data for establishing paths between the NEs 211. The PCE may also be configured to determine scores for the paths based on the routing costs and power consumption data, as discussed below. The network 200 may comprise one or more PCCs 220 which may be connected to a PCE 230 and one or more NEs 211. The NEs 211 may be part of an interconnected network 210 of NEs 211.

Figure 3:
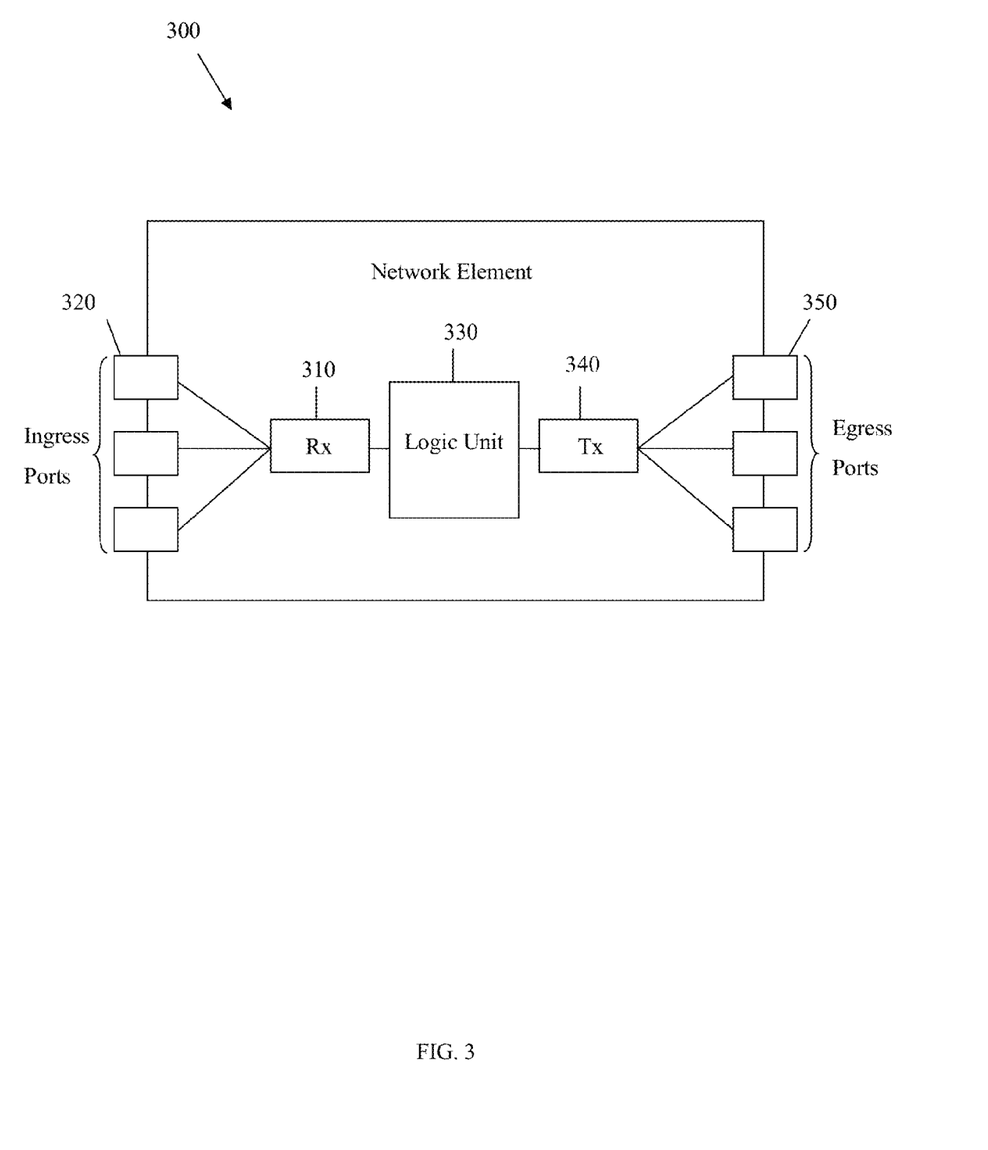
FIG. 3 is a schematic diagram of an embodiment of an NE.

FIG. 3 is a schematic diagram of an embodiment of an NE 300, which may function as a node in network 100 and/or 200. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features/methods described in the disclosure may be implemented in a network apparatus or component, such as an NE 300. For instance, the features/methods in the disclosure may be implemented using hardware, firmware, and/or software installed to run on hardware. The NE 300 may be any device that transports frames through a network, e.g., a switch, router, bridge, server, etc. As shown in FIG. 3, the NE 300 may comprise a receiver (Rx) 310 coupled to plurality of ingress ports 320 for receiving frames from other nodes, a logic unit 330 coupled to the receiver to determine which nodes to send the frames to, and a transmitter (Tx) 340 coupled to the logic unit 330 and to plurality of egress ports 350 for transmitting frames to the other nodes. The logic unit 330 may comprise one or more multi-core processors and/or memory devices, which may function as data stores. The ingress ports 320 and/or egress ports 350 may contain electrical and/or optical transmitting and/or receiving components. NE 300 may or may not be a routing component that makes routing decisions.

Figure 4:
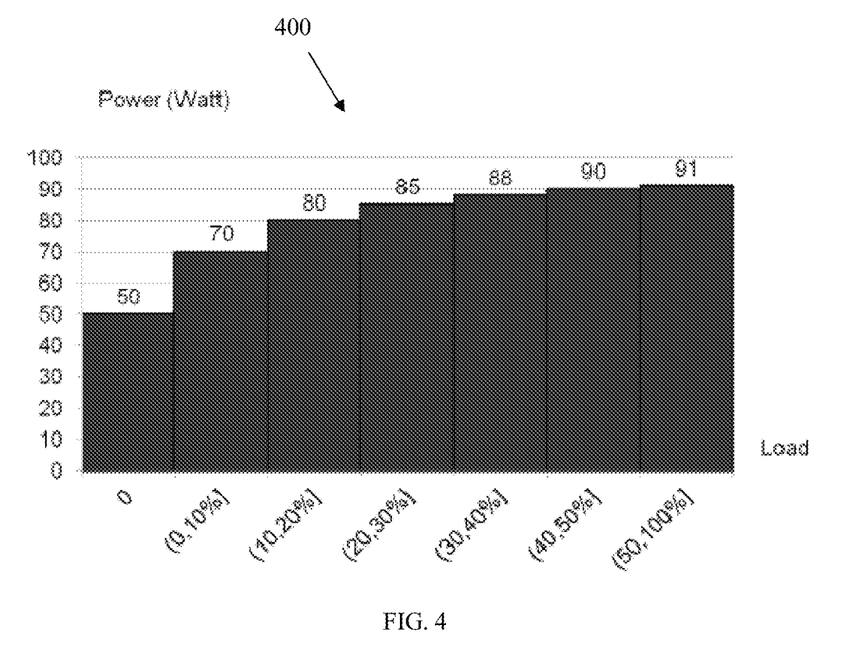
FIG. 4 is a bar graph of example power consumption data of an embodiment of an NE.

FIG. 4 is a bar graph of example power consumption data 400 of an embodiment of an NE, such as NE 300. The power consumption data 400 is used for purposes of discussion, so that example calculations hereunder may be undertaken with example data. The graph shows average power consumption data 400 of the NE over discrete percentage ranges of the NEs data traffic load capacity. Data traffic load capacity may be the maximum number of connections and/or data paths that may be managed by and/or routed through an NE. The power consumption data 400 of an NE may be available from the NEs manufacturer. The example data indicate that the NE consumes 50 watts of power while in an idle state, meaning that the NE consumes 50 watts of power when operational but managing no data paths. The NE consumes an average of 70 watts of power when managing between 0 and 10 percent of its capacity. The NE consumes 80 watts between 10 and 20 percent capacity, 85 watts between 20 and 30 percent capacity, 88 watts between 30 and 40 percent capacity, 90 watts between 40 and 50 percent, and 91 watts between 50 and 100 percent capacity. One skilled in the art will understand that the NE with power consumption data 500 may manage more data paths per unit of power when operating at higher percentages of data traffic load capacity, and therefore may become progressively more energy efficient when managing progressively more data paths up to the NEs data traffic load capacity.

Figure 5:
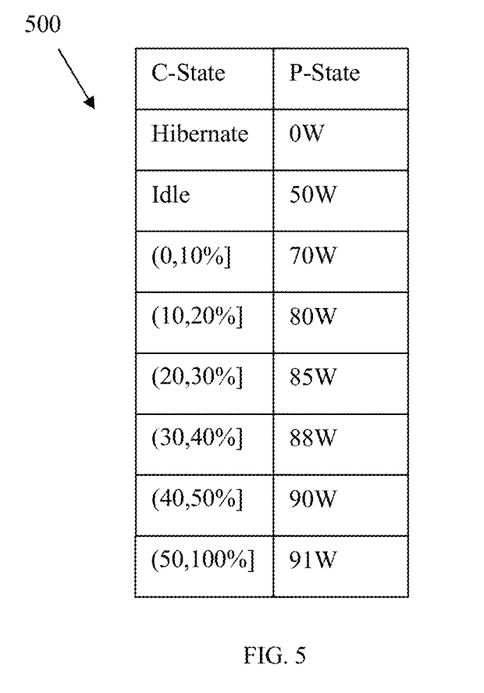
FIG. 5 is an example of power consumption data of an embodiment of an NE in table format.

FIG. 5 is an example of power consumption data 500 of an embodiment of an NE in table format. The power consumption data 500 is substantially the same as power consumption data 400 with the exception that it is represented in table format. One skilled in the art will recognize that NEs are configured to go into a hibernation mode when not in use. The data 500 for the NEs hibernation mode has been added to the table, showing that the NE consumes no power when in hibernation mode. The NEs data traffic load capacity by percentage is designated as the C-State column and the associated power usage is designated as the P-State column.

Figure 6:
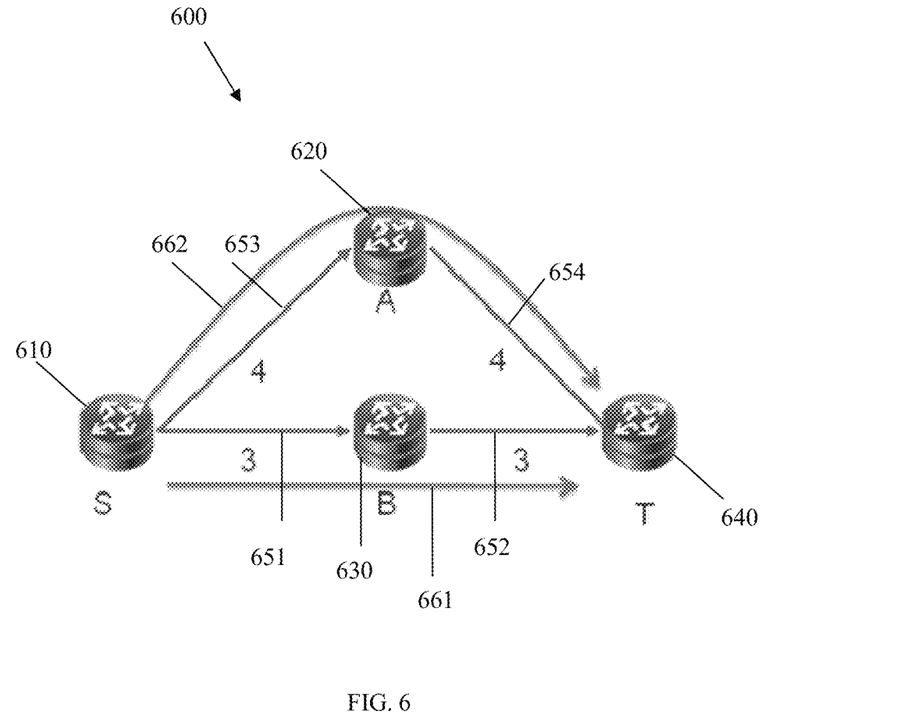
FIG. 6 is a schematic diagram of an embodiment of a network subset.

FIG. 6 is a schematic diagram of an embodiment of a network subset 600. The network subset 600 is disclosed for the purpose of providing a simple example for the calculations and methods provided herein. The network subset 600 may be a subset of network 100, network 200, and/or many other network architectures or topologies. The network subset 600 may comprise node S 610, Node A 620, Node B 630, and Node T 640. The nodes may comprise NEs. The nodes may be logically connected or coupled by logical links. Each link may have an associated routing cost, which may be determined by traditional routing cost metrics, using Interior Gateway Protocol (IGP), such as Open Shortest Path First (OSPF) or Intermediate System to Intermediate System (IS-IS), Simple Network Management Protocol (SNMP), and/or similar protocols or algorithms. Link SA 653 connects node S 610 and node A 620 and may have a routing cost of 4. Link SB 651 connects node S 610 and node B 630 and may have a routing cost of 3. Link BT 652 connects node B 630 and Node T 640 and may have a routing cost of 3. Link AT 654 connects node A 620 and node T 640 and may have a routing cost of 4. In network subset 600, data may be transmitted from node S 610 to node T 640 along a first data path 661 or a second data path 662. Data paths may be determined by various routing protocols/algorithms such as, Shortest Path First (SPF), Constrained Shortest Path First (CSPF), Equal Cost Multi-Path (ECMP) routing, multi-topology (MP) routing as defined by [RFC 4915], Resource Reservation Protocol-Traffic Engineering (RSVP-TE), Label Distribution Protocol (LDP), and/or other commonly used routing protocols or algorithms.

The following equations may be employed to consider both routing cost and power consumption data of a new data flow along a data path in the network subset 600:

$$S = \alpha * \text{Cost} + \beta * \text{Consumption} \quad\quad 1$$

$$\text{Cost} = \sum_{i \in All}\left(f_i \cdot \sum_{l \in P_i} W_l\right) \quad\quad 2$$

In equation 1, S may be the score for a new data flow along a single data path and may be used for routing decisions and cost may be the network routing cost of the data path determined by equation 2. Consumption may be the sum of the power consumption of all nodes and/or logical links in the network based on the power consumption data. $\alpha$ and $\beta$ may be coefficients that may be used by system operators or other users to bias the calculation for greater routing efficiency or greater energy efficiency. $\alpha$ and $\beta$ may retain the relationship of $\alpha+\beta=1$. In equation 2, $f_i$ is the $i^{th}$ data flow, $P_i$ is the potential data path the $i^{th}$ data flow may traverse, and $W_l$ is the routing cost of using a particular link and/or node. Cost is the total network routing cost based on all data flows including the $i^{th}$ flow and background data flows. Equations 1 and 2 may be used to determine an aggregate score for a network state based on the routing cost and power consumption data for all background flows and the new potential data path. Equations 1 and 2 may be applied repeatedly by selecting alternate potential data paths to accept the $i^{th}$ flow. The results may then be compared and the potential data path with the lowest aggregate network score may be chosen. By using equation 1 and/or equation 2, a routing component may determine a score for a data path based on the cost data and the power consumption data by multiplying the cost data associated with the use of the data path by a first constant, multiplying the power consumption data associated with the use of the data path by a second constant, and adding the results. In an alternative embodiment, the principals embodied by equations 1 and 2 may be used to calculate the score of a potential path by calculating only the power consumption and routing cost of the individual path and not the power consumption and routing cost of the entire network state.

Equations 1 and 2 are used as part of an example scoring calculation based on data network subset 600. For purposes of calculation simplicity, each link is presumed to have power consumption data as disclosed in FIG. 5, and each node is assumed to require no power. Each link is assumed to have a data traffic load capacity of 10 Gigabits per second (Gbps). The first data path 661 may have a background flow of 1 Gbps and the second data path 662 a background flow of 2 Gbps. $\alpha$ is assumed to be 0.6 and $\beta$ 0.4. The routing cost of each link is listed on FIG. 6. The score of the current network state may be calculated as follows:

$$S_0 = 0.6*(2*8+1*6)+0.4*(80+80+70+70)=133.2$$

Node S 610 may determine to transfer an additional 1 Gbps of data traffic to node T 640. In network subset 600 the first data path 661 and the second data path 662 are available to effectuate such transfer. The potential scores of the network state after selecting one of the potential data paths may be calculated as follows, where $S_1$ is the network state after selecting the first data path 661 and $S_2$ is the network state after selecting the second data path 662:

$$S_1 = 0.6*(2*8+2*6)+0.4*(80+80+80+80)=144.8$$

$$S_2 = 0.6*(3*8+1*6)+0.4*(85+85+70+70)=142$$

The routing component, which may be an NE 120 or PCE 230, may route the new data flow along the second data path 662 because its score is lower than that of the first data path 661. Meanwhile, a traditional cost-only routing system would analyze both data paths and make the opposite choice because routing cost 6 is lower than routing cost 8 despite the difference in power consumption.

Depending on the requirements placed on the network subset 600, the routing component may also consider optimizing the data traffic load on the network subset 600 by rerouting background data traffic. If all data traffic is rerouted to the first path 661, node A 620, link SA 653, and link AT 654 may all be placed in hibernation mode. The score of the network subset 600 state is calculated as follows, where $S_3$ is the network state where all data traffic is rerouted along the first data path 661:

$$S_3 = 0.6*(4*6)+0.4*(88+88)=84.8$$

Since the score for $S_3$ is lower than the scores for either $S_1$ or $S_2$ the routing component may choose network state $S_3$ and make routing changes accordingly.

Figure 7:
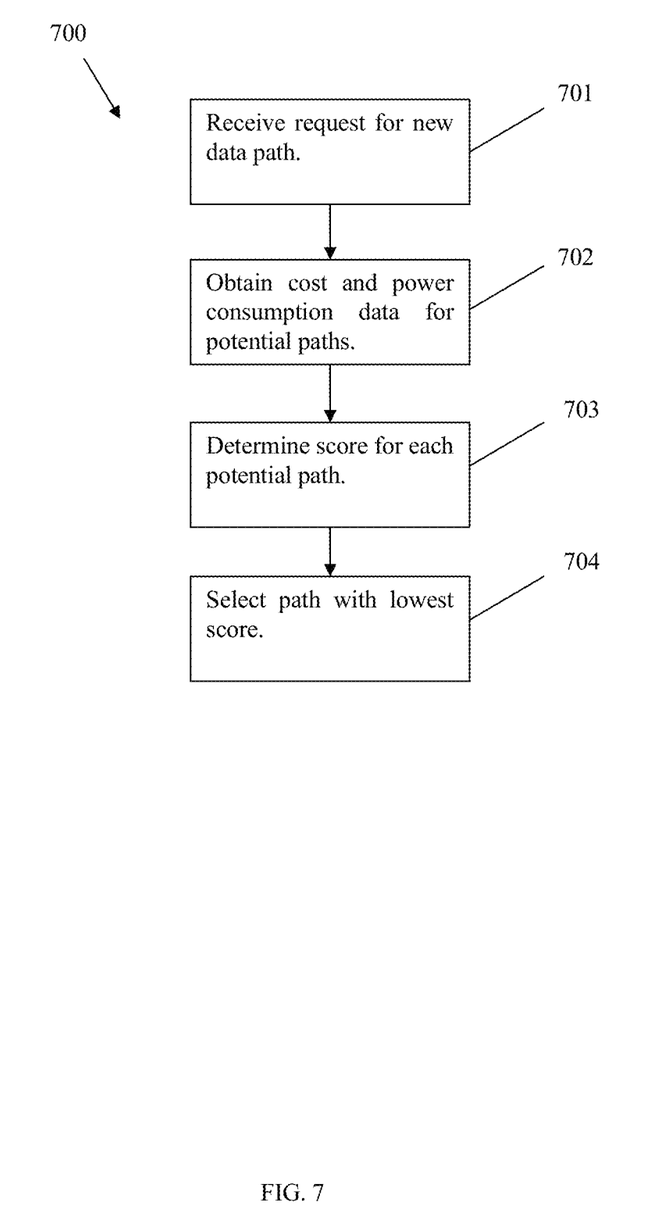
FIG. 7 is a flow diagram of an embodiment of a new route selection method.

FIG. 7 is a flow diagram of an embodiment of a new route selection method 700. The route selection method 700 may be used in optical networks, such as wavelength switched optical networks (WSON), networks operating in the electric domain, and other networks with NEs that consume power. In FIG. 7, the routing component receives a request to route a new data flow along a new data path 701. Cost data and power consumption data may then be obtained for a plurality of potential data paths in the network 702. Using the equations disclosed above, the routing component may determine the score of multiple alternate network states, each including a different new potential data path 703. In the alternative, the routing component may score each new data path individually based on the cost and power consumption data without considering the background data flows of the network state. The routing component may then select the new data path for the new data traffic that results in the lowest network state or data path score 704. For reasons of efficiency, the routing component may exclude clearly suboptimal data paths from consideration based on certain criteria. For example, the routing component may be configured to remove all data paths from current or future consideration that have a score exceeding 200 or power consumption data exceeding 100 watts.

Figure 8:
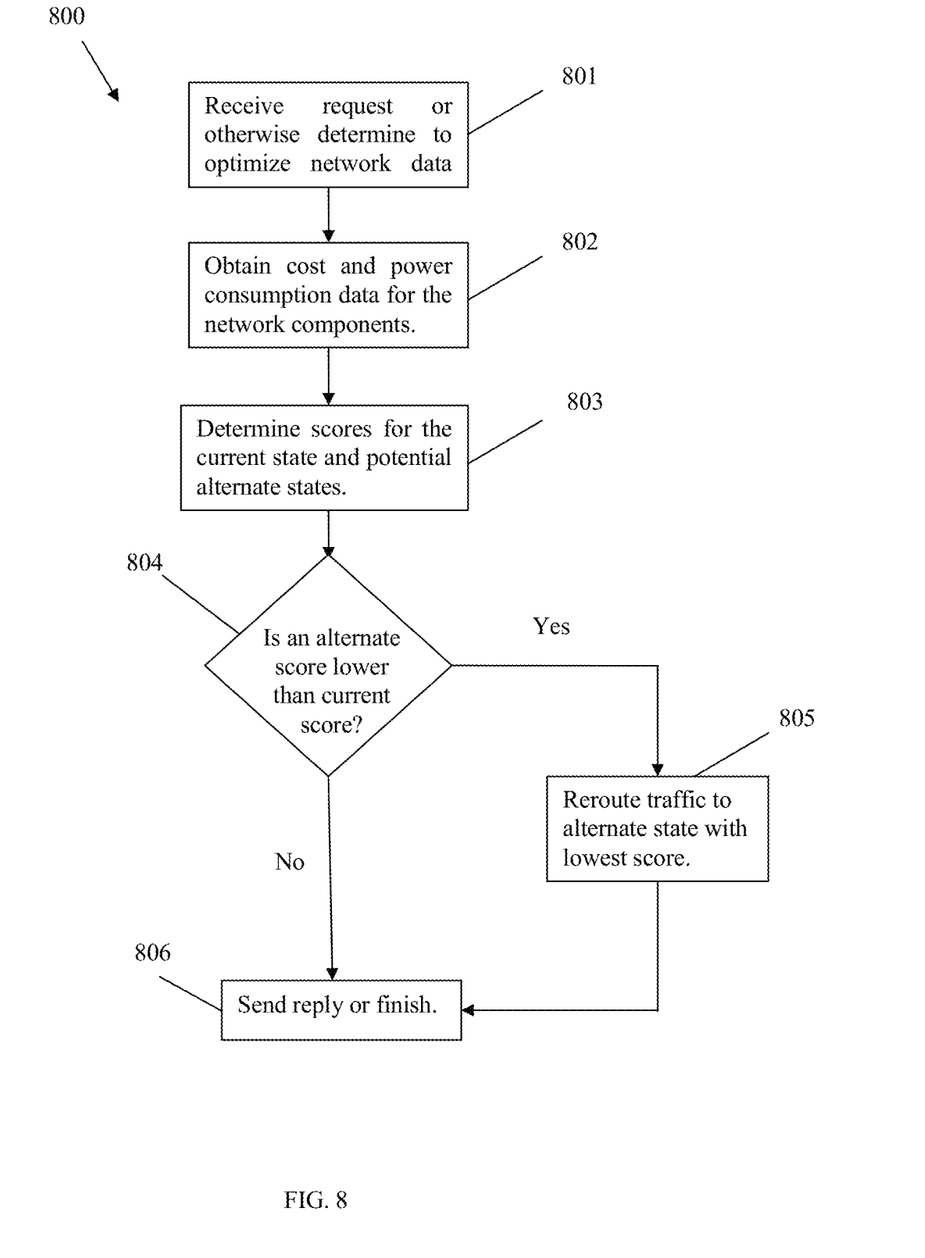
FIG. 8 is a flow diagram of an embodiment of a network data traffic load optimization method.

FIG. 8 is a flow diagram of an embodiment of a network data traffic load optimization method 800. The data traffic load optimization method 800 may be used in optical networks, such as wavelength switched optical networks (WSON), networks operating in the electric domain, and other networks with NEs that consume power. The routing component may receive an optimization request, initiate optimization based on programming or input, or otherwise determine to optimize the data traffic load on the network 801. The routing component may obtain routing costs and power consumption data for the components in the network 802. The routing component may then determine a score for the current network state and scores for potential alternate states using the equations discussed above 804. If the score of an alternate state is lower than the score of the current state 804, the routing component may reroute data traffic in a manner consistent with the alternate network state with the lowest score 805. Such rerouting of existing data traffic may allow one or more NEs to be placed in hibernation mode. If the current network state has the lowest score, no optimization is needed. The routing component may then send an appropriate reply to the component initiating the optimization 806.

Multiple embodiments are disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a hardware memory device comprising cost data associated with use of a plurality of paths for a new flow in a communications network, and power consumption data associated with use of network elements positioned along the paths to communicate the new flow; and
   at least one hardware processor coupled to the hardware memory device and configured to:
      determine a network state score for each path based on the cost data and the power consumption data, wherein each network state score is based on power consumption increases associated with communicating the new flow and power consumption changes associated with background flows across the network elements positioned along an associated path; and
      select a path with a lowest network state score from the plurality of paths to communicate the new flow.

2. The apparatus of claim 1, wherein the apparatus determines the network state scores by multiplying cost data associated with communicating the new flow across a candidate path by a first constant, multiplying power consumption data associated with communicating the new flow across a candidate path by a second constant, and adding products of the multiplication operations.

3. The apparatus of claim 2, wherein the first constant, the second constant, or both are selected by a user.

4. The apparatus of claim 1, further comprising a receiver configured to receive a path selection request.

5. The apparatus of claim 1, wherein the processor is configured to remove all data paths from consideration associated with a network state score exceeding a given threshold.

6. The apparatus of claim 1, further comprising a transmitter configured to determine the cost data by transmitting messages employing an Interior Gateway Protocol (IGP), and wherein the IGP is Open Shortest Path First (OSPF) or Intermediate System to Intermediate System (IS-IS).

7. The apparatus of claim 1, wherein each network state score is determined according to:

$$S = \alpha * \text{Cost} + \beta * \text{Consumption};$$

and $$\text{Cost\_total} = \sum_{i \in All} \left( f_i \cdot \sum_{l \in P_i} W_l \right),$$

where S is a score for the new flow along a single path, cost is a routing cost for the single path, consumption is power consumption of all nodes along the single path attributable to the new flow, path $\alpha$ and $\beta$ are user supplied coefficients, $f_i$ is the new flow, $P_i$ is a candidate path for the new flow, $W_l$ is a routing cost of a network element, and cost_total is the network state score based on the routing cost and power consumption data for all background flows and the new flow traversing the candidate path.

8. A path computation element (PCE) comprising:
a receiver configured to receive data from a plurality of network elements (NEs), wherein the data comprises:
costs for establishing paths via a plurality of the NEs in a communication network; and
power consumption data for establishing a candidate path between the NEs, wherein power consumption data for establishing the candidate path between the NEs comprises non-constant power consumption of each NE over discrete percentage ranges of a data traffic load capacity of the NEs; and
a hardware processor coupled to the receiver and configured to determine a score for the candidate path based on the cost and power consumption data.

9. The PCE of claim 8, wherein the power consumption data received from the NEs comprises non-constant power consumption data of each NE in an idle state and hibernation mode, wherein the idle state consumes more power than the hibernation mode and less power than an active state.

10. The PCE of claim 8, wherein the data traffic load capacity of each NE is represented as a capacity state (C-State) and the non-constant power consumption over the discrete percentage ranges of the data traffic load capacity of each NE is represented as a power state (P-State).

11. The PCE of claim 10, wherein the P-state is about zero when the C-State indicates hibernation mode, wherein the P-State is over a half of maximum when the C-State indicates idle, and wherein the P-State is about maximum over a C-State range extending from about half of maximum C-State to about maximum C-State.

12. The PCE of claim 8, wherein the score for the candidate path is determined according to:

$$S = \alpha * \text{Cost} + \beta * \text{Consumption};$$

and $$\text{Cost\_total} = \sum_{i \in All} \left( f_i \cdot \sum_{l \in P_i} W_l \right),$$

where S is a score for a new flow along a single path, cost is a routing cost for the single path, consumption is power consumption of all nodes along the single path attributable to the new flow, path $\alpha$ and $\beta$ are user supplied coefficients, $f_i$ is the new flow, $P_i$ is the candidate path for the new flow, $W_l$ is a routing cost of a network element, and cost_total is a network state score based on the routing cost and power consumption data for all background flows and the new flow traversing the candidate path.

13. A method comprising:
receiving, by a receiver of a path computation element (PCE), cost data for a plurality of candidate paths for a new flow in a communications network;
receiving, by the PCE receiver, power consumption data for network elements positioned along the candidate paths to communicate the new flow; and
determining, a hardware processor of the PCE, network state scores for the candidate paths for the new flow based on the cost data and the power consumption data, wherein each network state score is based on power consumption increases associated with communicating the new flow and power consumption changes associated with background flows across the network elements positioned along an associated candidate path.

14. The method of claim 13, further comprising selecting a candidate path with a lowest network state score for communicating the new flow.

15. The method of claim 13, wherein determining the network state scores for the candidate paths based on the cost data and power consumption data comprises determining a single score for a plurality of assigned paths and a single candidate path by employing data for existing data traffic in a present network usage state.

16. The method of claim 13, further comprising rerouting existing data flows assigned to assigned paths when a network state score for an alternate network usage state is lower than a network state score for a present network usage state.

17. The method of claim 16, wherein the rerouting of existing data flows is performed to allow one of the network elements to be placed in hibernate mode.

18. The method of claim 13, wherein the network state scores for the candidate paths are determined according to:

$$S = \alpha * \text{Cost} + \beta * \text{Consumption};$$

and $$\text{Cost\_total} = \sum_{i \in All} \left( f_i \cdot \sum_{l \in P_i} W_l \right),$$

where S is a score for the new flow along a single path, cost is a routing cost for the single path, consumption is power consumption of all nodes along the single path attributable to the new flow, path $\alpha$ and $\beta$ are user supplied coefficients, $f_i$ is the new flow, $P_i$ is a candidate path for the new flow, $W_l$ is a routing cost of a network element, and cost_total is a network state score based on the routing cost and power consumption data for all background flows and the new flow traversing the candidate path.

* * * * *